(12) United States Patent
Bach et al.

(10) Patent No.: US 11,114,678 B2
(45) Date of Patent: Sep. 7, 2021

(54) BIPOLAR PLATE SEAL ASSEMBLY AND FUEL CELL STACK WITH SUCH A BIPOLAR PLATE SEAL ASSEMBLY

(71) Applicants: VOLKSWAGEN AG, Wolfsburg (DE); AUDI AG, Ingolstadt (DE)

(72) Inventors: Peter Bach, Burnaby (CA); Andrew Desouza, Burnaby (CA); Ian Stewart, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 119 days.

(21) Appl. No.: 16/479,474

(22) PCT Filed: Jan. 24, 2018

(86) PCT No.: PCT/EP2018/051642
§ 371 (c)(1),
(2) Date: Jul. 19, 2019

(87) PCT Pub. No.: WO2018/138107
PCT Pub. Date: Aug. 2, 2018

(65) Prior Publication Data
US 2019/0393518 A1    Dec. 26, 2019

(30) Foreign Application Priority Data
Jan. 24, 2017   (DE) .................. 10 2017 101 276.1

(51) Int. Cl.
*H01M 8/0273*    (2016.01)
*H01M 8/028*    (2016.01)
*H01M 8/0286*    (2016.01)

(52) U.S. Cl.
CPC ......... *H01M 8/0273* (2013.01); *H01M 8/028* (2013.01); *H01M 8/0286* (2013.01)

(58) Field of Classification Search
CPC ... H01M 8/0273; H01M 8/028; H01M 8/0286
See application file for complete search history.

(56) References Cited

U.S. PATENT DOCUMENTS

| | | | |
|---|---|---|---|
| 5,514,487 | A | 5/1996 | Washington et al. |
| 2004/0247981 | A1 | 12/2004 | Cummins et al. |

(Continued)

FOREIGN PATENT DOCUMENTS

| | | |
|---|---|---|
| DE | 695 11 585 T3 | 12/2005 |
| DE | 10 2004 033 821 A1 | 2/2006 |

(Continued)

*Primary Examiner* — Olatunji A Godo
(74) *Attorney, Agent, or Firm* — Seed IP Law Group LLP

(57) ABSTRACT

A bipolar plate seal assembly for a fuel cell is provided. The bipolar plate seal assembly includes: a bipolar plate having a flow field for a reactant medium on at least one of its main sides, and a supply area arranged adjacent to the flow field, in which supply ports for feeding and discharging the reactant medium and optionally for feeding and discharging a coolant are arranged; and at least one seal assembly having an electrically insulating layer covering at least one or more sections of the supply area of the bipolar plate and having recesses that correspond to the supply ports of the bipolar plate, and for each recess, a seal circumferential thereto.

12 Claims, 3 Drawing Sheets

(56) References Cited

U.S. PATENT DOCUMENTS

| | | |
|---|---|---|
| 2006/0131819 A1 | 6/2006 | Kurano et al. |
| 2012/0231370 A1* | 9/2012 | Rock .................. H01M 8/0276 429/508 |
| 2015/0228987 A1 | 8/2015 | Andreas-Schott et al. |
| 2016/0036068 A1* | 2/2016 | Goebel ............... H01M 8/0271 429/535 |

FOREIGN PATENT DOCUMENTS

| | | |
|---|---|---|
| DE | 10 2012 020 947 A1 | 4/2014 |
| DE | 10 2013 208 839 A1 | 11/2014 |
| WO | 2008/029243 A1 | 3/2008 |

\* cited by examiner

BIPOLAR PLATE SEAL ASSEMBLY AND FUEL CELL STACK WITH SUCH A BIPOLAR PLATE SEAL ASSEMBLY

BACKGROUND

Technical Field

The disclosure relates to a bipolar plate seal assembly for a fuel cell or a fuel cell stack. The disclosure also relates to a fuel cell or a fuel cell stack with such a bipolar plate seal assembly.

Description of the Related Art

Fuel cells use the chemical conversion of a fuel with oxygen into water in order to generate electrical energy. For this purpose, fuel cells contain as their core component the so-called "membrane electrode assembly" (MEA), which is a structure consisting of an ion-conducting (mostly proton-conducting) membrane and two catalytic electrodes (anode and cathode) arranged on both sides of the membrane. The latter mostly comprise carbon-supported precious metals, in particular platinum. In addition, gas diffusion layers (GDL) can be arranged on both sides of the membrane electrode assembly, on the sides of the electrodes facing away from the membrane. Generally, the fuel cell is formed by a plurality of MEAs arranged in the stack, the electrical power outputs of which MEAs add up. Bipolar plates (also called flow field plates or separator plates), which ensure a supply of the individual cells with the operating media, i.e., the reactants, and which are usually also used for cooling, are generally arranged between the individual membrane electrode assemblies. In addition, the bipolar plates also ensure an electrically conductive contact to the membrane electrode assemblies.

While the fuel cell is operating, the fuel (anode operating medium), in particular hydrogen $H_2$ or a hydrogen-containing gas mixture, is supplied to the anode via an anode-side open flow field of the bipolar plate where electrochemical oxidation of $H_2$ into protons $H^+$ occurs with the release of electrons ($H_2 \rightarrow 2\ H^+ + 2\ e^-$). Via the membrane (electrolyte), which separates the reaction chambers from each other in a gas-tight manner and electrically insulates them, the protons are transported (water-bound or water-free) from the anode chamber to the cathode chamber. The electrons provided at the anode are guided to the cathode via an electrical line. Oxygen or an oxygen-containing gas mixture (such as air) as the cathode operating medium is supplied to the cathode via a cathode-side open flow field of the bipolar plate so that a reduction of $O_2$ to $O^{2-}$ occurs with the accretion of electrons (½ $O_2 + 2\ e^- \rightarrow O^{2-}$). At the same time, in the cathode chamber the oxygen anions react with the protons transported across the membrane with the formation of water ($O^{2-} + 2\ H^+ \rightarrow H_2O$).

Seals must be provided between the bipolar plates and the membrane electrode assemblies of fuel cells in order to seal the anode and cathode chambers to the outside in a fluid-tight manner and thus to prevent a leakage of the reactant media (anode or cathode operating medium). Seals are provided for this purpose; these encircle, on the one hand, the active areas and, on the other hand, the supply ports of the bipolar plate or membrane electrode assemblies, which in the fuel cell stack are stacked flush with the main supply channels. Various sealing concepts are known. In some approaches, the circumferential seals are injection-molded onto the bipolar plate. In addition, solutions are known by which the MEA structure comprising membrane and electrodes is surrounded by a stabilizing frame and the seals are injection-molded thereupon. A further approach provides that the MEA structure comprising membrane and electrodes be encapsulated by a sealing frame of an elastic material by means of an injection-molding process (LIM for liquid injection molding) (see FIG. 3). The result is an elastic, flexible and electrically insulating frame structure in which the supply ports and sealing lips for the supply ports and the chemically active area are integrally formed. Although this design is compact and economically attractive, the flexibility of the sealing frame is disadvantageous in that it makes alignment difficult when assembling the stack, due to the lack of rigidity, and can lead to the misalignment of the cells. In addition, the material cannot be optimized for the various tasks of comprehensive sealing and insulation. In addition, large seal assemblies cause problems in the injection-molding process and during operation, due to their thermal expansion or contraction.

DE 10 2012 020 947 A1 discloses a membrane electrode assembly for a fuel cell. The membrane electrode assembly has a seal that comprises partial sections arranged on both sides of the membrane electrode assembly. The published document discloses that preferably a chemically active area of the membrane electrode assembly, which is exposed to the operating media during operation, be surrounded circumferentially by the seal.

BRIEF SUMMARY

Embodiments of the invention are based on providing a sealing concept for a fuel cell that overcomes some or all of the problems described above.

The bipolar plate seal assembly according to an embodiment of the invention for a fuel cell comprises:
- a bipolar plate having:
  - a flow field for a reactant medium on at least one of the two main sides of the bipolar plate, and
  - a supply area arranged adjacent to the flow field, in which supply ports for feeding and discharging the reactant medium and optionally for feeding and discharging a coolant are arranged; and
- at least one seal assembly having:
  - an electrically insulating layer covering at least sections of the supply area of the bipolar plate and having recesses that correspond to the supply ports of the bipolar plate, and
  - for each recess, a seal circumferential thereto.

According to such an embodiment of the invention, the seals for the supply ports are thus assigned to the bipolar plate (instead of to the membrane electrode assembly, for example). In this case, the seal assembly according to an embodiment of the invention is arranged in the area of the supply area of the bipolar plate, in other words the non-active area in which the supply ports are arranged, and is preferably attached thereto. This allows the seals for the supply ports to be removed from the membrane electrode assembly, thus avoiding the flexible sealing frame of the membrane electrode assembly described in the introduction, which solves the problems described regarding aligning the components during stack assembly.

Within the context of embodiments of the invention, the term "reactant medium" refers to the anode and cathode operating media, for example hydrogen and air. Generally, the bipolar plate has at least two supply ports for each reactant medium, one for feeding and one for discharging the reactant medium. In addition, the bipolar plate can also have corresponding supply ports for a coolant. Preferably, the seal assembly has a corresponding recess for each of the existing supply ports and a circumferential seal for each. Generally, the bipolar plate has several, frequently two supply areas on each of its two main sides, each of which is arranged on the side of the flow field and thus of the chemically active area of the fuel cell. For example, a first supply area serves to arrange supply ports for feeding reactant media and, if necessary, coolant, and a second supply area serves to arrange supply ports for their discharge. Preferably, a seal assembly is provided for all supply areas on one main side of the bipolar plate. Furthermore, the at least one seal assembly can be provided on both main sides of the bipolar plate. If, however, the membrane electrode assembly in the preferred arrangement does not extend over the supply areas of the bipolar plate, in other words essentially only over the active area, the at least one seal assembly is preferably provided only on one of the two main sides of the bipolar plate.

Within the context of embodiments of the invention, by recesses of the seal assembly "corresponding" to the supply ports of the bipolar plate is meant that each of the recesses has a shape essentially identical to that of the supply ports and is arranged in the same position (in other words, congruent) with them.

According to a first advantageous development of the bipolar plate seal assembly according to an embodiment of the invention, the electrically insulating layer and the seal of the seal assembly consist of the same material, which can be elastic, for example. In this case, they are particularly preferred to be one-piece; that is, integrally formed from one material. The advantage of this arrangement is that the seal assembly can be manufactured particularly economically in just one production process.

As part of this arrangement, it is advantageous if the electrically insulating layer and the seal are applied to the bipolar plate by an injection-molding process; in other words, they are molded-on. In particular, the so-called "LIM process" can be used here (for liquid injection molding). With an injection-molding process, the flowable reaction mixture for the elastic material to be produced is injected into an injection mold into which the bipolar plate is inserted. Here, the reaction mixture fills the cavities of the mold in contact with the inserted bipolar plate, and polymerization is started thermally or by a chemical initiator. When the reaction is complete, the mold is opened and the produced component is demolded. The advantage here is that there is an immediate formation of a firmly bonded connection between the bipolar plate and the electrically insulating layer.

According to an alternative development, the electrically insulating layer of the seal assembly is formed as a carrier film connected to the seal. The carrier film can be attached to the bipolar plate, in particular to its supply area, by an adhesive. In this design, the seal is preferably applied to the carrier film by an injection-molding process, to which the preceding explanations apply correspondingly. The advantage of this development is that the carrier film and the seal can be made of different materials and can therefore be optimized for their respective functions, specifically electrical insulation on the one hand and fluid-tight sealing on the other hand. In addition, the carrier film can be produced with a greater stiffness, which further facilitates the assembly process of the fuel cell stack.

According to a modification of the last-mentioned development of the invention, seals are applied to both sides of the carrier film. In this modification, such a double-sided seal is arranged on the bipolar plate without adhesive.

In a particularly advantageous embodiment of the invention, the seal assembly does not have a seal circumferential to the flow field of the bipolar plate. Instead, in this case it is assigned to the membrane electrode assembly. The function of sealing the supply ports is thus shifted to the bipolar plate, while the function of sealing the active area is performed by the membrane electrode assembly provided with a corresponding seal. This embodiment reduces the complexity of the seal assembly and facilitates the assembly of the fuel cell stack.

The seal of the seal assembly according to one or more embodiments of the invention and, if applicable, the electrically insulating layer, when this is not formed as a carrier film, are made of an electrically insulating polymer material that is preferably elastic. Silicones, rubbers and other elastomers or thermoplastic-elastomer materials are particularly suitable here.

The carrier film may in particular be produced from an electrically insulating thermoplastic or thermoset polymer material.

An additional aspect of the present invention relates to a fuel cell stack comprising at least two bipolar plate seal assemblies according to embodiments of the present invention and a membrane electrode assembly extending between two adjacent flow fields of two bipolar plate seal assemblies.

The fuel cell stack is thus composed of n membrane electrode assemblies and (n+1) bipolar plate seal assemblies, wherein the two outermost bipolar plate seal assemblies generally have a flow field only on their inward main side and are also referred to as monopolar plates.

In some instances, it is provided that the membrane electrode assembly does not extend over the supply area of the bipolar plate seal assembly; in other words, it essentially extends only over its flow field. In such a fuel cell stack, a seal assembly of a first bipolar plate seal assembly is thus in contact with a supply area of a bipolar plate of an adjacent second bipolar plate seal assembly. Since a seal assembly is thus arranged between two adjacent supply areas of two bipolar plates, the corresponding supply ports are reliably sealed.

In some instances, the membrane electrode assembly of the stack has a (preferably elastic) seal that encircles its catalytically active area and thus the flow field of the adjacent bipolar plate seal assembly. Here, the seal circumferential to the active area may be molded onto the membrane electrode assembly, in particular by an injection-molding process.

The seal circumferential to the active area of the membrane electrode assembly may be produced from the same materials as the seals for the supply ports of the bipolar plate seal assembly.

Another embodiment of the invention relates to a fuel cell system that has a fuel cell stack according to one or more embodiments of the fuel cell stacks disclosed herein. In particular, the fuel cell system has an anode supply and a cathode supply with the corresponding peripheral components in addition to the fuel cell stack.

Another embodiment of the invention relates to a vehicle that has a fuel cell system with a fuel cell stack according to one or more embodiments of the fuel cell stacks disclosed herein. The vehicle is preferably an electric vehicle in which an electrical energy generated by the fuel cell system serves to supply an electric traction motor and/or a traction battery.

Aspects and features of the various embodiments of the invention mentioned in this application may be combined advantageously with one another unless stated otherwise in individual cases.

BRIEF DESCRIPTION OF THE SEVERAL VIEWS OF THE DRAWINGS

The invention is explained below in exemplary embodiments in reference to the respective drawings. The following is shown.

DETAILED DESCRIPTION

Figure 1:
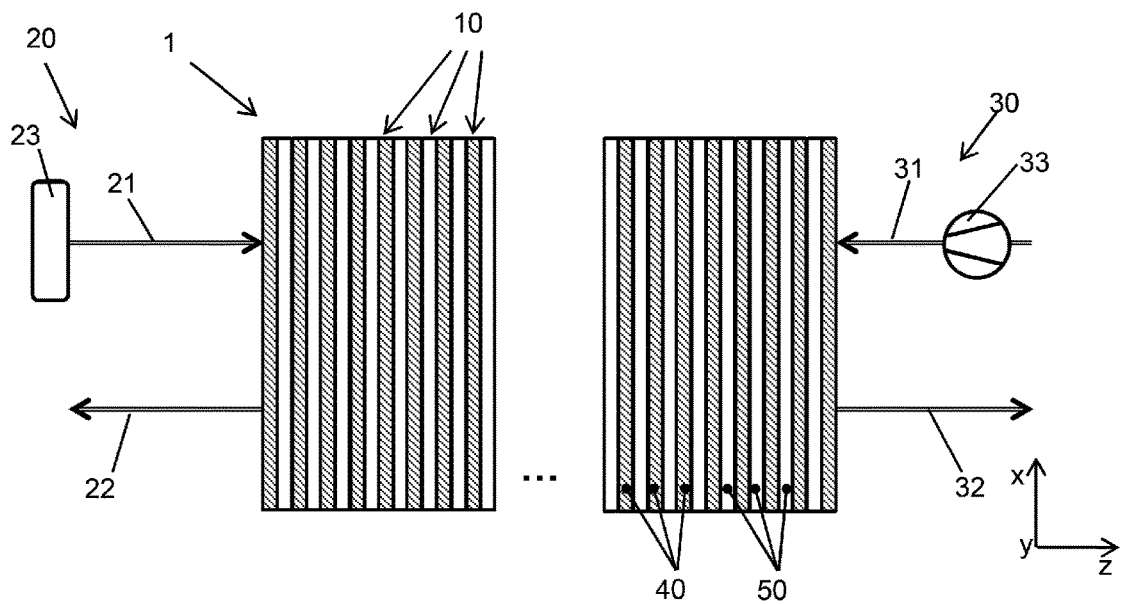
FIG. 1 a fuel cell system.

FIG. 1 shows a greatly simplified fuel cell system. The fuel cell system is a part of a vehicle that is not further shown, in particular an electric vehicle that has an electric traction motor supplied with electrical energy by the fuel cell system.

The fuel cell system comprises as a core component a fuel cell stack 1 having a large number of bipolar plate seal assemblies 40 and membrane electrode assemblies 50 stacked alternately in stack direction z. In each case, a membrane electrode assembly 50 and two adjoining half-sides of a bipolar plate seal assembly 40 form a fuel cell (single cell) 10. Typically, several hundred individual cells 10 are combined to form a fuel cell stack 1 and are electrically connected in series with each other.

In order to supply the fuel cell stack 1 with the operating media, the fuel cell system has an anode supply 20 on the one hand and a cathode supply 30 on the other hand. The anode supply 20 comprises an anode supply path 21, which serves to supply an anode operating medium (fuel), for example hydrogen, to the anode chambers 12 of the fuel cell stack 10. For this purpose, the anode supply path 21 connects a fuel reservoir 23 to an anode inlet of the fuel cell stack 10. The anode supply 20 also comprises an anode exhaust path 22 which discharges the anode exhaust gas from the anode chambers via an anode outlet of the fuel cell stack 10. The cathode supply 30 comprises a cathode supply path 31 which supplies an oxygen-containing cathode operating medium to the cathode chambers of the fuel cell stack 10, in particular air which is sucked in from the environment. The cathode supply 30 also comprises a cathode exhaust path 32, which discharges the cathode exhaust gas (in particular the exhaust air) from the cathode chambers of the fuel cell stack 10 and supplies it, if appropriate, to an exhaust system (not shown). A compressor 33 is arranged in the cathode supply path 31 for conveying and compressing the cathode operating medium.

Figure 2:
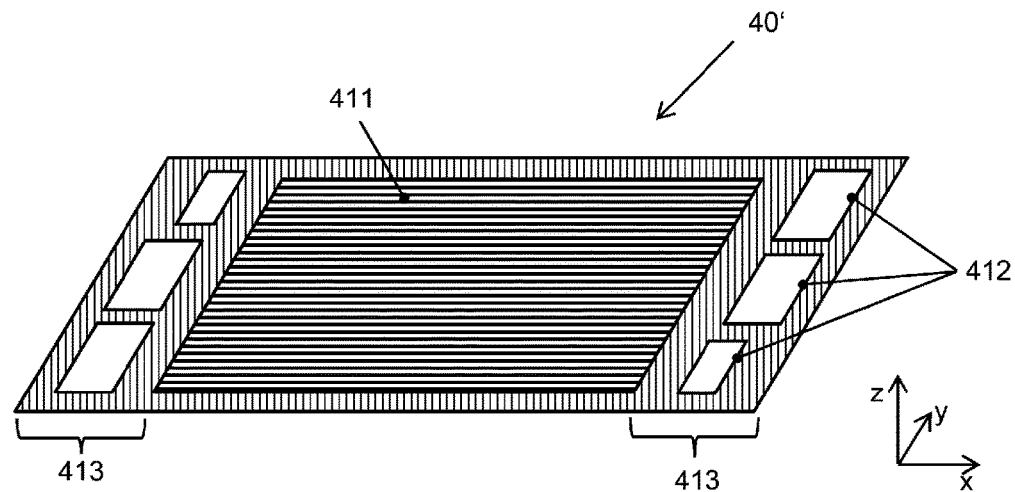
FIG. 2 a bipolar plate according to the prior art.

FIG. 2 shows a bipolar plate 40' according to the prior art. The bipolar plate 40' has two main sides, on each of which a flow field 411, consisting of a large number of flow channels, is arranged. The flow fields 411 serve to feed and distribute a reactant medium to the catalytic electrodes (anode or cathode) of the adjacent membrane electrode assembly 50. An anode operating medium is fed to the cathode of the MEA 50 via a flow field 411 of the anode of the MEA 50 arranged on the anode side of the bipolar plate 40' and a cathode operating medium. The bipolar plate 40' also has two non-active supply areas 413 adjacent to the flow field 411 on both sides, in which different supply ports 412 are arranged. Typically for each reactant medium, at least one supply port 412 for feeding and one supply port for discharging the medium are provided. In addition, a coolant field is often formed inside the bipolar plate 40', through which a coolant can be passed to dissipate the fuel cell reaction heat. In such a case, the bipolar plate 40' also has for the coolant a feed supply port 412 and a discharge supply port 412.

Figure 3:
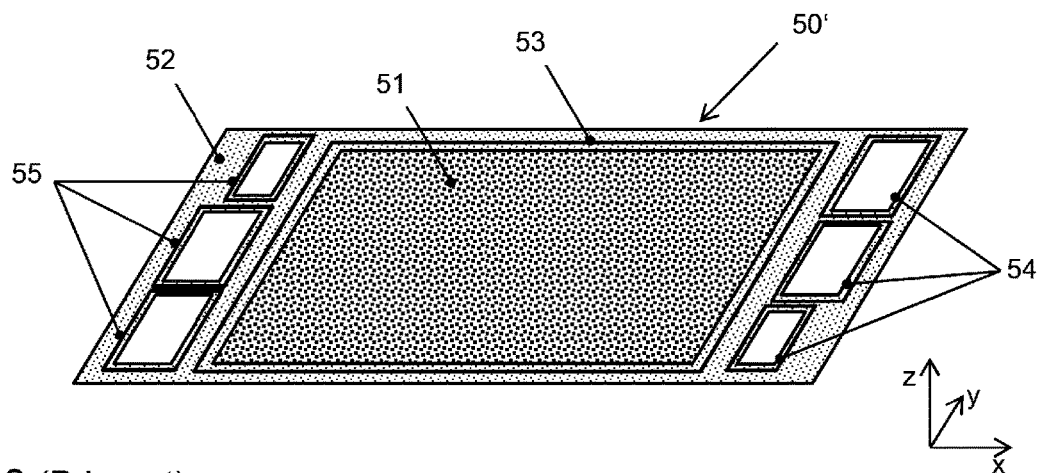
FIG. 3 a membrane electrode assembly according to the prior art.

FIG. 3 shows a membrane electrode assembly 50' according to the prior art. The membrane electrode assembly 50' has in its central section a polymer electrolyte membrane (not visible here), which may comprise an ion-conducting polymer, in particular a proton-conducting polymer, for example a product marketed under the trade name Nafion. A catalytic electrode 51 is arranged on each side of the polymer electrolyte membrane, specifically an anode on a first side and a cathode on the second side of the membrane. The catalytic electrodes 51 can take the form of double-sided catalytic coatings of the membrane or of independent layers, for example, catalytically coated carrier layers, which are arranged on the membrane. For example, each of the catalytic electrodes 51 comprises a catalytically active material, in particular platinum alone or as an alloy with other metals, which is present in the form of a very fine particulate distribution carried on an electrically conductive carrier material. Carbon-based materials in particular are used as carrier materials. The central area of the membrane electrode assembly 50', where the catalytic electrodes 51 are present, is also referred to as the active area, since this is where the fuel cell reactions take place.

The membrane electrode assembly 50' according to the prior art also features an elastic sealing frame 52, which is molded around the catalytic electrode 51 structure made of the membrane and electrodes 51. Recesses 54, which correspond in shape and position to the supply ports 412 of the bipolar plate 40' of FIG. 2, are formed in the sealing frame 51. The recesses 54 are formed circumferentially in the elastic sealing frames 52 and elastic seals 55. The seals 55 encircle each individual recess 54 and typically have the shape of beading.

If the conventional bipolar plate 40' and the membrane electrode assemblies 50' are stacked on top of each other according to FIGS. 2 and 3, the supply ports 412 and recesses 54 form supply channels which pass through the fuel cell stack 1 in its stacking direction z.

During the operation of fuel cell stack 1, the anode operating medium, in particular hydrogen, is supplied to the stack 1 via the anode supply path 21. The hydrogen passes through the corresponding supply channels of the stack and is fed via the anode-side flow field 411 of the bipolar plate 40' to the anodic electrode 51 of the membrane electrode assembly 50' and distributed via this. Here, a catalytic dissociation and oxidation of hydrogen H2 to protons H+ takes place with the release of electrons, which are dissipated via an external circuit of the fuel cell stack. On the other hand, the cathode operating medium, in particular air, is fed to the stack 1 via the cathode supply path 31, and is distributed into the individual cells via the corresponding supply channels and the cathode-side flow field 411 of the bipolar plate 40' and is supplied to the cathodic electrode 51 of the membrane electrode assembly 50'. The protons H+ formed on the anode side diffuse via the polymer electrolyte membrane onto the cathode side of the fuel cell 10. Here, the protons react with the supplied atmospheric oxygen at the catalytic metal of the cathodic electrode 51, taking up the electrons supplied via the outer circuit so as to form water, which is discharged from the fuel cell with the reaction gas via the cathode exhaust gas path 32. The electrical current generated in this manner can supply electricity to an electrical consumer, such as a traction motor in an electric vehicle or a battery.

One problem with the conventional bipolar plate 40' according to FIG. 2 and the conventional membrane electrode assembly 50' according to FIG. 3 is that the flexible elastic sealing frame 52 makes it difficult to align the individual components when assembling the fuel cell stack. This may result in lateral displacements of the membrane electrode assembly 50' with respect to the bipolar plate 40'. An additional problem is the thermal expansion behavior of the relatively large-area elastic sealing frame 52, both during its production in the injection-molding process and during operation in the fuel cell.

Figure 4A:
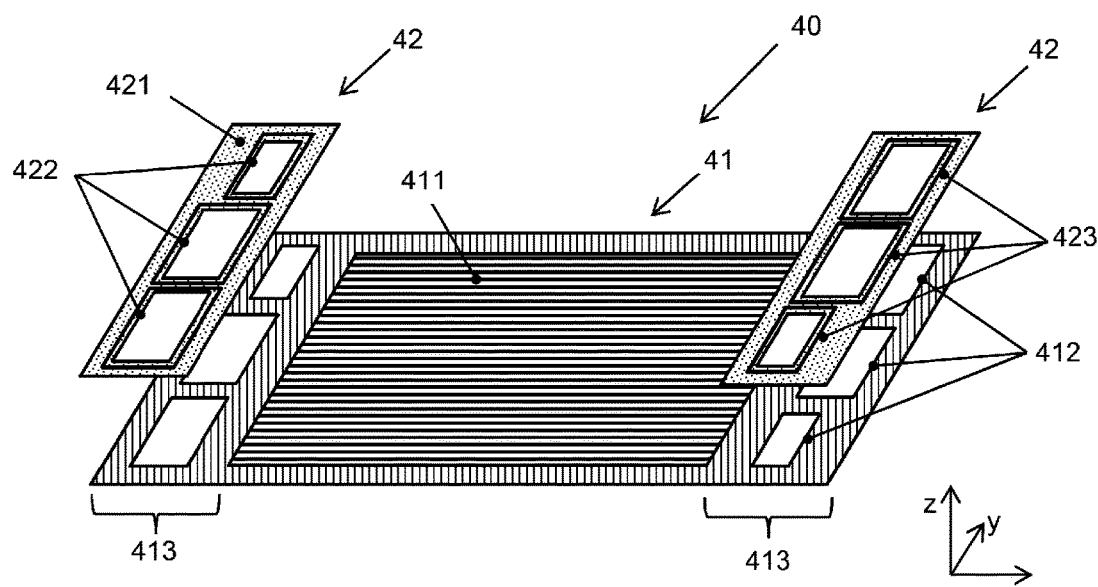
FIG. 4 a bipolar plate seal assembly according to a first development of the invention: (A) perspective exploded view, (B) perspective plan view, (C) sectional view along sectional plane A-A.
Figure 4B:
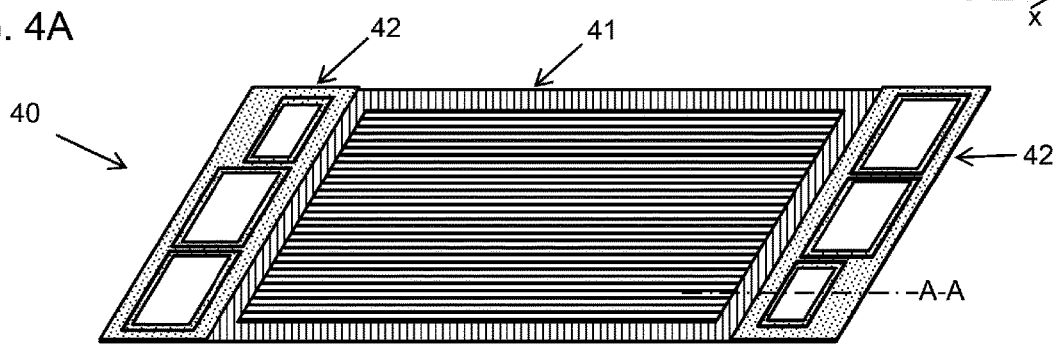
Figure 4C:
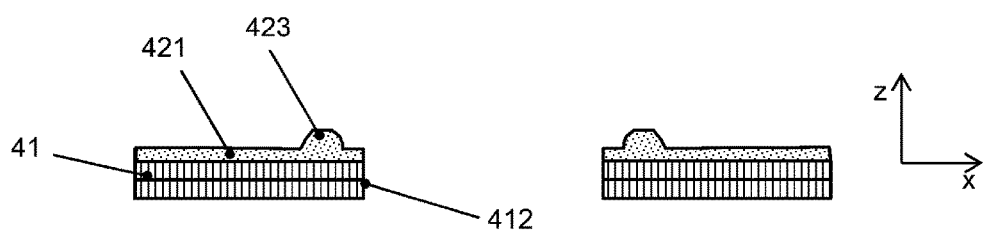

FIGS. 4A-4C show a bipolar plate seal assembly 40 according to a first embodiment of the present invention. The bipolar plate seal assembly 40 has a bipolar plate 41, which essentially corresponds to the bipolar plate 40' according to FIG. 2 and to which the same explanations apply. In particular, the bipolar plate 41 has a flow field 411 for each reactant medium on both of its main sides. Furthermore, the bipolar plate 41 has two supply areas 413 that are arranged adjacent to the flow field 411 and in which supply ports 412 for feeding and discharging the reactant media and the coolant are arranged.

The bipolar plate seal assembly 40 according to the illustrated embodiment of FIGS. 4A-4C also comprises two seal assemblies 42. Each of the seal assemblies 42 has an electrically insulating layer 421 that covers the supply areas 413 of the bipolar plate 41. In the electrically insulating layer 421, recesses 422 are formed, which correspond to the supply ports 412 of the bipolar plate 41 with respect to their shape and their position within the xy plane. Each of the seal assemblies 42 also has seals 423 that encircle the recesses 422 and are in particular elastic. As can best be seen in the sectional view in FIG. 4C of section plane A-A from FIG. 4B, in the first embodiment of the invention shown, the seals 423 and the electrically insulating layer 421 are formed in one piece from the same elastic material, for example a silicone. Here, the seal 423, for example, takes the form of a sealing beading that encircles the supply port 412 of the bipolar plate 41 in a sealing manner. The electrically insulating layer 421 and the seal 423 are preferably applied directly to the bipolar plate by an injection-molding process; that is, they are molded-on. This creates a firmly bonded connection between the layer 421 and the bipolar plate 41 immediately during production.

Figure 5:
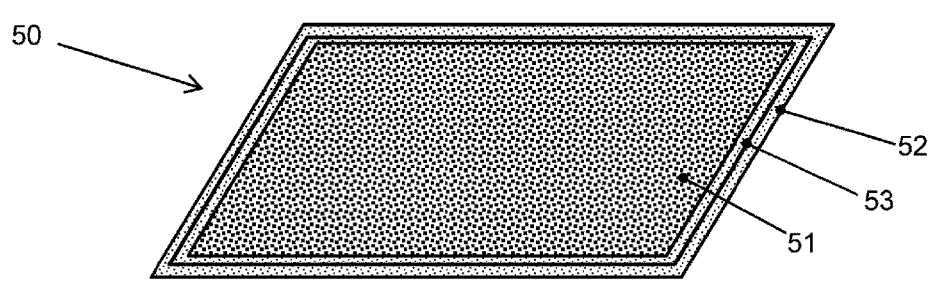
FIG. 5 a membrane electrode assembly according to a development of the invention.

FIG. 5 shows a membrane electrode assembly 50, which can be used advantageously together with a bipolar plate seal assembly 40 according to embodiments of the invention in a fuel cell stack 1. The membrane electrode assembly 50 according to an embodiment of the invention features a polymer electrolyte membrane not visible here and two catalytic electrodes 51 arranged on both sides. The same embodiments as with the conventional membrane electrode assembly 50' according to FIG. 3 apply here. The structure comprising membrane and catalytic electrodes 51 is circumferentially enclosed by a sealing frame 52 made of a preferably elastic material. The sealing frame 52 also forms a seal 53, which surrounds the active area with the catalytic electrodes 51 in a circumferential and fluid-sealing manner Preferably, the frame 52 with the seal 53 is injection-molded onto the membrane electrode structure by an injection-molding process. The membrane electrode assembly 50 according to the illustrated embodiment of FIG. 5 thus differs from the conventional arrangement according to FIG. 3 in that the supply sections on both sides with the recesses 54 and the seals 55 for the supply ports of the bipolar plate are not present. Only the sealing function for the active area 51 thus remains on the membrane electrode assembly 50 according to the illustrated embodiment of FIG. 5, while the sealing function for the supply ports 412 is shifted to the bipolar plate seal assembly 40 of FIGS. 4A-4C. Thus, if the bipolar plate seal assemblies 40 according to FIGS. 4A-4C are stacked with membrane electrode assemblies 50 according to FIG. 5 alternately with a fuel cell stack 1 according to FIG. 1, the membrane electrode assembly 50 will essentially extend only across the flow field 411 of the bipolar plate 41, wherein the seal 53 of the membrane electrode assembly 50 encircles the flow field 411 in a sealing manner and seals the flow field 411 to the outside. At the same time, the seals 423 of a bipolar plate seal assembly 40 are applied to a bipolar plate 41 of a subsequent bipolar plate seal assembly, thus sealing the supply ports 412 against each other.

Since the membrane electrode assemblies 50 in such a fuel cell stack 1 according to one or more embodiments of the invention do not have any projecting and excessively flexible supply sections as in FIG. 3, the alignment and stacking of the components 40, 50 to form a fuel cell stack 1 is considerably facilitated. In addition, the problems of thermal expansion or shrinkage of the sealing frame of the conventional membrane electrode assembly 50' are largely avoided. Due to the reduced complexity of the seal assembly on the part of the MEA, the product yield can also be increased during overmolding of the MEA. It is also possible to use sealing materials with a lower viscosity, thereby reducing injection pressures during overmolding of the bipolar plate 41, thus reducing the risk of cracks in the bipolar plate 41 and increasing the yield here as well.

Figure 6A:
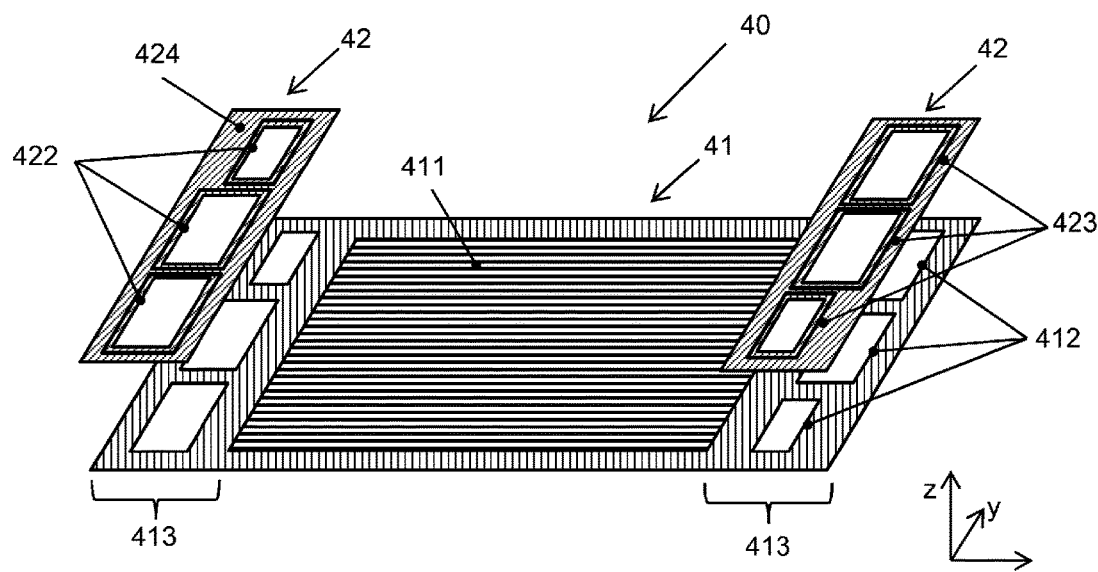
FIG. 6 a bipolar plate seal assembly according to a second development of the invention: (A) perspective exploded view, (B) perspective plane view, (C) sectional view along sectional plane A-A according to FIG. 4B.
Figure 6B:
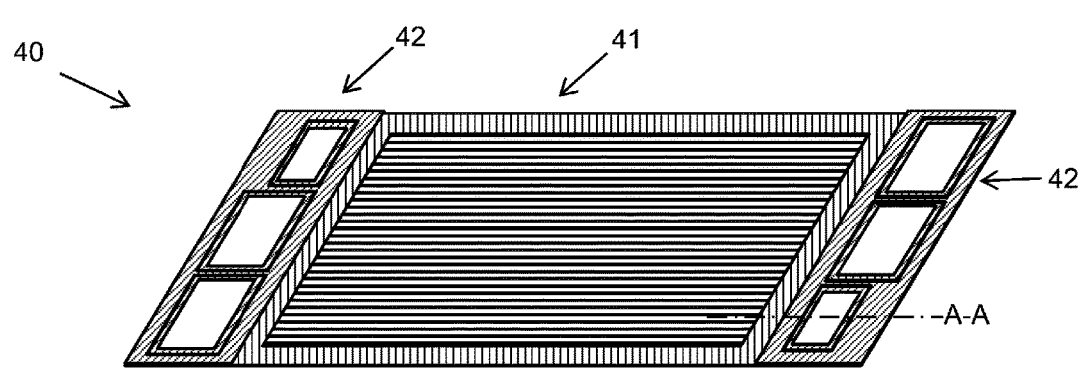
Figure 6C:
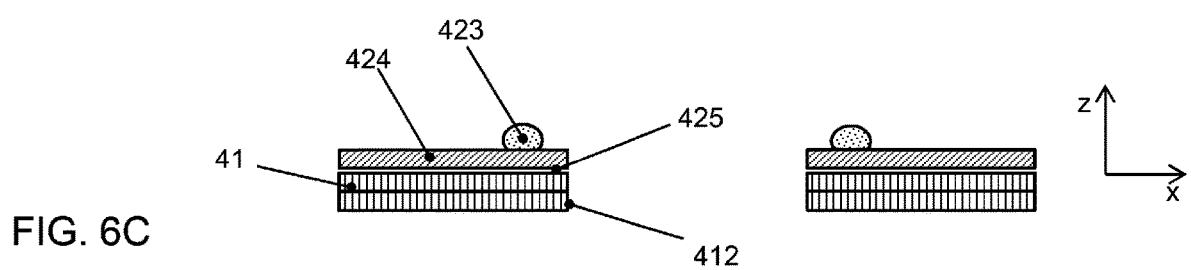

FIGS. 6A-6C show a bipolar plate seal assembly 40 according to a second embodiment of the present invention. Here the same reference signs again designate the same elements as in FIGS. 4A-4C and are not described again in detail.

The bipolar plate seal assembly 40 according to the second embodiment differs from the first in that the electrically insulating layer here is formed as a carrier film 424 and consists of a material different to the seals 423. For example, the carrier film 424 can consist of a thermally and chemically resistant thermoplastic. The material should be electrically insulating and does not however need to be elastic. As in the first exemplary embodiment, the seals 423 consist of an elastic material, in particular a silicone material. The seals 423 may be applied to the carrier film 424 by an injection-molding process, wherein the LIM process can also be used here. After injection molding, the carrier film 424 is applied to the non-active supply areas 413 of the bipolar plate 41 by means of an adhesive bond 425 and is connected to the bipolar plate 41.

The second embodiment makes it possible to optimize the materials for the carrier film 424 and the seal 423 in accordance with their functions.

The bipolar plate seal assembly 40 according to the second embodiment of the invention according to FIGS. 6A-6C may be assembled with the membrane electrode assembly 50 according to FIG. 5 so as to form a fuel cell stack.

According to a variant of the second embodiment of FIGS. 6A-6C (not shown), the carrier film 424 is provided on both sides with circumferential seals 423 for each of the recesses 422 or supply ports 412. In this example, the carrier film 424 is not bonded to the bipolar plate 41. Instead, the bipolar plate 41 and the seal assembly 42 are loosely arranged on top of each other and stacked together with the membrane electrode assemblies 50 to form a fuel cell stack.

In general, in the following claims, the terms used should not be construed to limit the claims to the specific embodiments disclosed in the specification and the claims, but should be construed to include all possible embodiments along with the full scope of equivalents to which such claims are entitled

The invention claimed is:

1. A bipolar plate assembly for a fuel cell, comprising:
   a bipolar plate having:
      a flow field for a reactant medium on at least one main side of the bipolar plate;
      a first supply area arranged adjacent to a first side of the flow field, in which plural first fluid ports are arranged; and
      a second supply area arranged adjacent to a second side of the flow field opposite to the first side, in which plural second fluid ports are arranged;
   a first seal assembly having:
      a first electrically insulating layer covering at least one or more sections of the first supply area of the bipolar plate and having recesses that correspond to the plural first fluid ports of the bipolar plate; and
      for each recess of the first seal assembly, a first seal circumferential to the recess and integral with the first electrically insulating layer; and
   a second seal assembly distinct from the first seal assembly, the second seal assembly having:
      a second electrically insulating layer covering at least one or more sections of the second supply area of the bipolar plate and having recesses that correspond to the plural second fluid ports of the bipolar plate; and
      for each recess of the second seal assembly, a second seal circumferential to the recess and integral with the second electrically insulating layer.

2. The bipolar plate assembly according to claim 1, wherein:
   the first electrically insulating layer and each first seal consist of the same material; and
   the second electrically insulating layer and each second seal consist of the same material.

3. The bipolar plate assembly according to claim 2, wherein the electrically insulating layers and the seals are applied to the bipolar plate by an injection-molding process.

4. The bipolar plate assembly according to claim 1, wherein the electrically insulating layers are carrier films connected to the respective seals.

5. The bipolar plate assembly according to claim 4, wherein the seals are applied to the carrier films by an injection-molding process.

6. The bipolar plate assembly according to claim 1, wherein the seal assemblies do not have a seal circumferential to the flow field of the bipolar plate.

7. A fuel cell stack, comprising:
   at least two bipolar plate assemblies according to claim 1; and
   in each case, a membrane electrode assembly extending between two adjacent flow fields of two adjacent bipolar plate assemblies.

8. The fuel cell stack according to claim 7, wherein the membrane electrode assembly does not extend over the supply area of either of the two adjacent bipolar plate seal assemblies.

9. The fuel cell stack according to claim 7, wherein the membrane electrode assembly has at least one seal that is circumferential to the flow field of one of the two adjacent bipolar plate seal assemblies and is molded onto the membrane electrode assembly.

10. The bipolar plate assembly according to claim 1, wherein the first fluid ports include at least one coolant port.

11. The bipolar plate assembly according to claim 2, wherein:
   the first electrically insulating layer and each first seal are formed in one piece; and
   the second electrically insulating layer and each second seal are formed in one piece.

12. The bipolar plate assembly according to claim 4, wherein the carrier films are attached to the bipolar plate by an adhesive.

* * * * *